May 7, 1963

N. B. CHEZEM 3,088,536

GROUND CUSHION CAR

Filed May 26, 1960

Inventor
NORMAN B. CHEZEM

By R. I. Tompkins
Leo I. Malossi
Attorneys

May 7, 1963  N. B. CHEZEM  3,088,536
GROUND CUSHION CAR
Filed May 26, 1960  3 Sheets-Sheet 3

Inventor
NORMAN B. CHEZEM

By R. J. Tompkins
Leo J. Malosu

Attorneys

United States Patent Office 3,088,536
Patented May 7, 1963

3,088,536
GROUND CUSHION CAR
Norman B. Chezem, N. 30, Apt. A, Memphis, Tenn.
Filed May 26, 1960, Ser. No. 32,057
3 Claims. (Cl. 180—7)
(Granted under Title 35, U.S. Code (1952), sec. 266)

The invention described herein may be manufactured and used by or for the Government of the United States of America for governmental purposes without the payment of any royalties thereon or therefor.

The present invention relates to ground-cushion vehicles and more particularly to construction thereof to provide stability and control during operation.

Ground-cushion vehicles are supported on a cushion of air developed between the base of the device and the surface of the ground (or water, ice or snow). To develop this cushion air is discharged downwardly from the particular vehicle in a jet curtain to trap air between the base of the vehicle and the ground surface. In this way the pressure of this trapped air is increased thereby providing an augmented lift force greater than could be realized from the jet reaction force of the discharging air alone. The value of this augmented lift force increases the closer the vehicle is operated to the surface being traversed. Also as the altitude of the vehicle is increased this augmented lift force will diminish until at some critical height which differs with the particular design the lift force is sharply reduced in value and remains at this low value at all higher altitudes. Thus, unless such a vehicle remains in reasonably close proximity to the ground during its operation the vehicle cannot form and retain the air cushion it requires to support its design load.

The ground-cushion is relied upon to sustain the ground-cushion vehicle during hovering and also during cruising while propulsion may be supplied either by a separate propulsion system or by the use of baffles to deflect the jet curtain.

Therefore, an object of the present invention is to produce a ground-cushion vehicle embodying simplicity of design and having inherent stability.

Another object is to produce a control system for a ground-cushion vehicle combining simplicity of construction and ease of handling.

A further object is the provision of a ground-cushion vehicle capable of operation over water without raising excessive spray and not limited to travel over a smooth terrain.

Other objects and many of the attendant advantages of this invention will be readily appreciated as the same become better understood by reference to the following detailed description when considered in connection with the accompanying drawings wherein.

Figure 1:
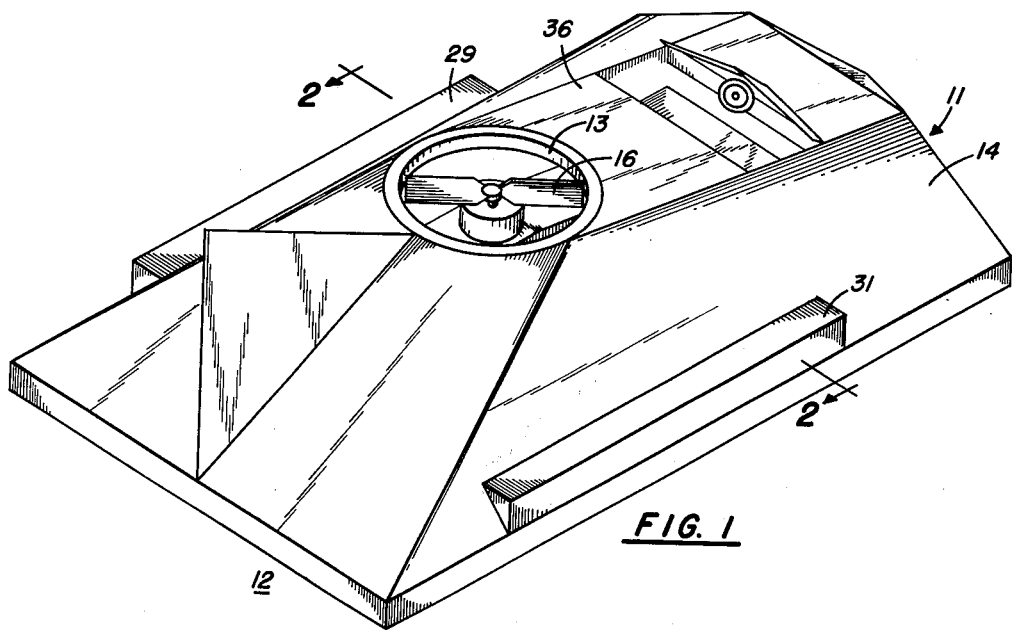
FIG. 1 is an isometric view of a preferred embodiment of the present invention shown hovering over the ground.
Figure 2:
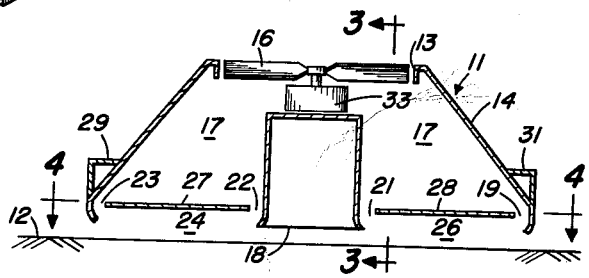
FIG. 2 is a section taken on line 2—2 of FIG. 1.

Referring now to the drawings, FIG. 1 shows a preferred embodiment of the present invention wherein ground-cushion vehicle 11 is shown hovering over surface 12. In operation, air is drawn through intake 13 at the top of housing 14 and pumped by fan 16 down into main air chamber 17 which extends above and to either side of float chamber 18 located in the center of the vehicle. This air is then forced under low pressure through four longitudinal slots 19, 21, 22, 23 each running the length of vehicle 11 and opening to the underside thereof. As shown in FIG. 2 the jets which exit from slots 19 and 21 will oppose each other as will be true of the jets from slots 22 and 23. Since each of these jets will in effect form a jet sheet or jet curtain of air two rail-like ground-cushions 24, 26 of high-pressure air are formed. These two rails in addition to providing an augmented lift force acting on bases 27, 28 also provide increased stability. The float chamber 18, to provide necessary buoyancy in the event that vehicle 11 is set down in the water, is arranged at the center of vehicle 11. Outriggers 29, 31 are also provided for added lateral support in water. The tops of outriggers 29, 31 also form a step to facilitate entrance to cockpit 32 or to inspect or service fan 16 or power plant 33.

Figure 3:
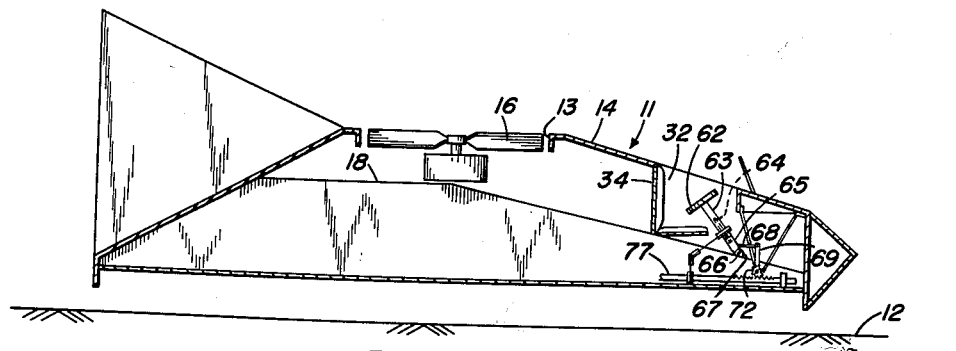
FIG. 3 is a longitudinal section taken on line 3—3 of FIG. 2.

As is illustrated in FIG. 3 cockpit 32 is arranged above float chamber 18 and sealed off from main air chamber 17 by cockpit walls 34, 36. The controls for vehicle 11 are located in cockpit 32 and consist of control means for pivotally-mounted acceleration surfaces 37, 38, 39, 41, 42, 43, 44, 46 to provide propulsion for both forward or backward motion; control means for pivotally-mounted turn surfaces 47, 48, 49, 51 as well as control means for pivotally-mounted surfaces 52, 53, 54, 56, 57, 58, 59, 61 used to produce movement of vehicle 11 to either side.

Figure 4:
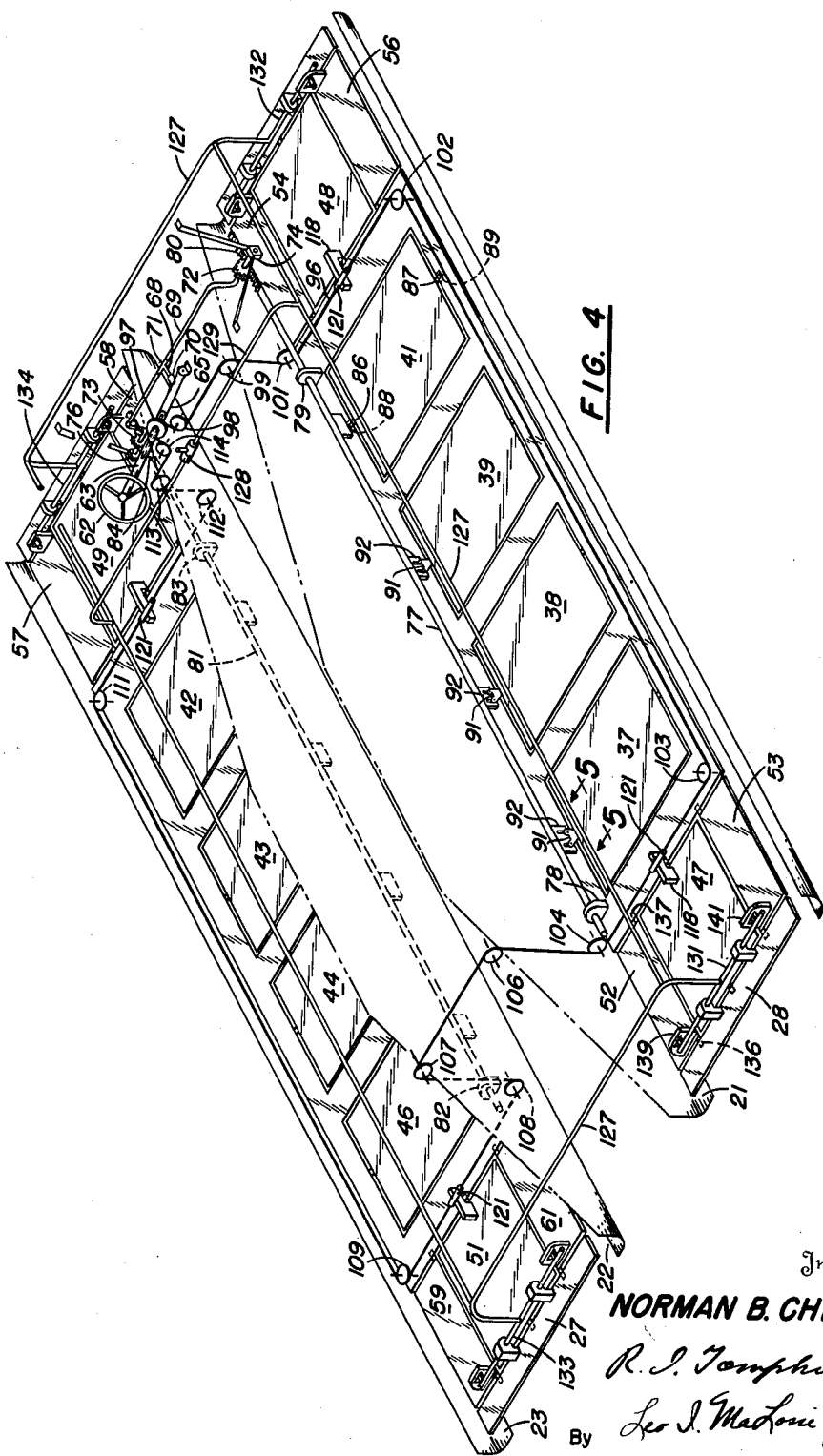
FIG. 4 is an isometric view of the control system taken on line 4—4 of FIG. 2.

As shown in more detail in FIG. 4, steering wheel 62 is affixed to steering column 63 which is freely rotatable on shank 64 formed as the reduced end of stick 65 attached with pin 66 to clevis 67 allowing stick 65 to be moved fore and aft about pin 66 as center-point. Strut 68 is coupled to stick 65 by ball and socket 70.

The other end of strut 68 is joined to crank 69 by means of sleeve 71 and is thereby freely rotatable relative to crank 69. Keyed to crank 69 are pinions 72, 73. At either end thereof crank 69 is rotatably mounted in bearings 74, 76 depending from housing 14. Slide shaft 77 mounted in slide bearings 78, 79 is adapted to be moved axially as crank 69 is rotated to move fore or aft since pinions 72, 73 are also rotated, pinion 72 being engaged with rack 80 formed on the forward portion of slide shaft 77. Slide shaft 81 is mounted on base 27 at the opposite side of float chamber 18 from slide shaft 77 in slide bearings 82, 83 with pinion 73 being engaged with rack 84 formed on slide shaft 81.

Figure 5:
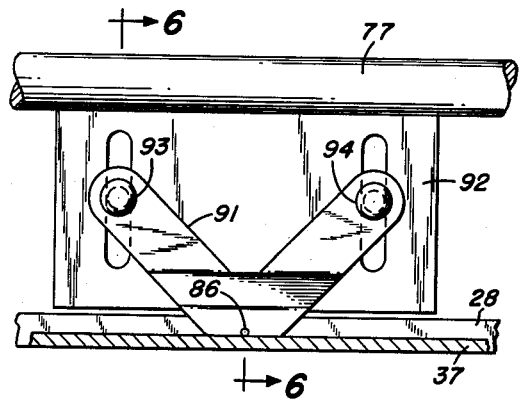
FIG. 5 is an enlarged view of the mechanism for pivoting the acceleration surfaces.
Figure 6:
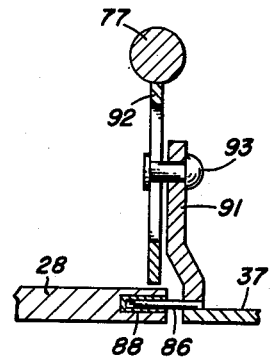
FIG. 6 is a section taken on line 6—6 of FIG. 5.

As the slide shafts are moved axially they cause pivoting of the acceleration surfaces through the action of the bell crank arrangement illustrated in FIGS. 5 and 6 wherein the typical pivoting arrangement for acceleration surfaces is shown. Thus acceleration surface 37 is pivotally mounted by means of pins 86, 87 freely rotatable in bearings 88, 89 in base 28. Bell crank 91 is rigidly affixed to acceleration surface 37 as shown and is also connected to slotted plate 92 by means of pins 93, 94, slotted plate 92 being rigidly connected to slide shaft 77. By this arrangement as slide shaft 77 and, of course slide shaft 81 is moved axially fore or aft, slotted plate 92 will also so move and pins 93, 94 will be forced to move in opposite directions vertically thereby rotating acceleration surface 37 about pins 86, 87 as center. Simultaneously all the other acceleration surfaces will also be rotated since when stick 65 is moved from neutral, crank 69 is moved moving slide shafts 77, 81 via pinions 72, 73 and actuating all acceleration surfaces in the same direction through bell crank-slotted plate combinations as discussed in connection with acceleration surface 37. Air escaping from the main air chamber 17 is directed fore or aft depending upon the direction in which the acceleration surfaces have been pivoted. Air escaping aft causes forward thrust while air escaping forward causes backward thrust or braking. The speed of travel will, of course, depend upon the amount of thrust which is a function of the degree to which the acceleration surfaces are opened.

Figure 7:
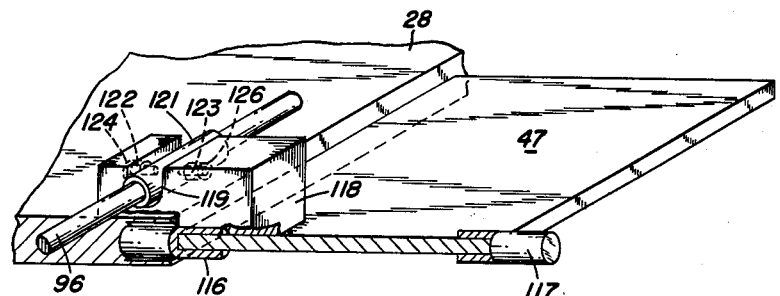
FIG. 7 is an isometric view of part of the mechanism for pivoting the turning surfaces and FIG. 8 is an isometric view of part of the mechanism for actuating the surfaces for propelling the vehicle sideways.

In order to produce a turn effect, turn surfaces 47, 48, 49, 51 are actuated in much the same way as the acceleration surface. In place of a crank and slide shaft arrangement cable 96 and a series of pulleys 97, 98, 99, 101, 102, 103, 104, 106, 107, 108, 109, 111, 112, 113, 114 are employed. Pulley 97 rotates when steering wheel 62 and steering column 63 are turned. The typical connection between cable 96 and the turning surfaces or panels is shown in FIG. 7. Turn surface 47 is pivotally mounted by means of pins 116, 117 freely rotatable in bearings (not shown) in base 28. Offset arm 118 is rigidly affixed to turn surface 47. At the outer end of offset arm 118 is formed jaw 119 opening upwardly to receive trunnion 121. Stub shafts 122, 123 of trunnion 121 are freely rotatable in bearings 124, 126 whereby as cable 96 is moved longitudinally and trunnion 121 moves therewith, the offset arm 118 is caused to move about pin 116 as center and thus turn-surface 47 is pivoted to one side or the other in response to rotation of steering wheel 62. In the arrangement shown in FIG. 4 all four turning surfaces act simultaneously.

Figure 8:
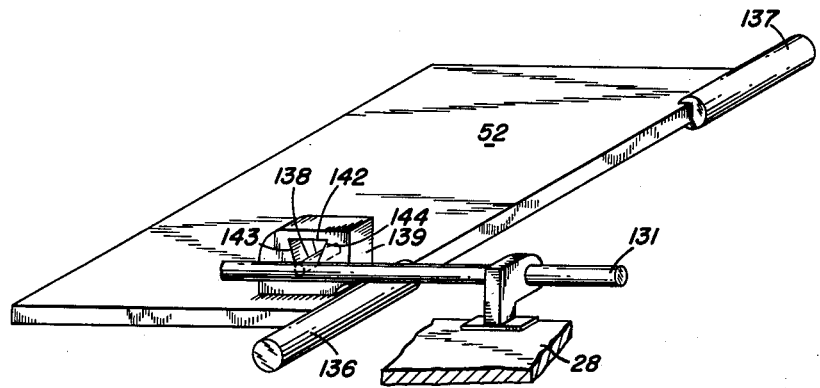

Additional means are provided adjacent the turn surfaces for use in propelling the vehicle sideways. These surfaces for sideward movement indicated as 52, 53, 54, 56, 57, 58, 59 and 61 are operable in unison by the movement of frame 127 to one side or the other by shifting handle 128 and push-bar 129 in that direction. At each of the four corners of frame 127 are rigidly connected arms 131, 132, 133 and 134. As is illustrated in FIG. 8 surface 52 may be pivoted about one side thereof around pins 136, 137 as center these pins being freely rotatable in bearings (not shown) in base 28. Arm 131 is connected by means of pin 138 to bracket 139 which is rigidly affixed to surface 52 (and also to bracket 141 which is rigidly affixed to surface 53). Opening 142 through bracket 139 is provided with sloping sides 143, 144 to facilitate the initiation of sliding action between these sides and pin 138 as arm 131 is moved to one side or the other. This pin and bracket connection is repeated between arm 131 and surface 53; arm 132 and surfaces 54, 56; arm 134 and surfaces 57, 58 and arm 133 and surfaces 59, 61. Thus, whenever the vehicle is hovering or cruising and it is desired to move to either side all that need be done is to move handle 128 in the direction opposite to the desired direction of movement. For example, to move to the left, handle 128 is pushed to the right. Push-bar 129 is moved thereby in that same direction as is also frame 127 and arms 131, 132, 133 and 134. Surfaces 53, 56, 58 and 61 are pivoted downwardly projecting below base 28 while surfaces 52, 54, 57 and 59 are pivoted upwardly into the main air chamber 17. Exiting air is thus allowed to escape to the right resulting in thrust to the left. In this manner the entire vehicle is moved to the left. Should handle 128 be moved to the left, vehicle 11 will be moved to the right.

It is, therefore, readily seen that the present invention provides a vehicle of simple construction and control as contrasted to present ground cushion vehicles which are complex in design and require a great deal of sheet metal forming and other expensive construction operations and materials.

Obviously many modifications and variations of the present invention are possible in the light of the above teachings. It is therefore to be understood that within the scope of the appended claims the invention may be practiced otherwise than as specifically described.

What is claimed is:

1. A ground-cushion vehicle comprising a housing having a base and air intake means, air-pump means mounted in said housing and communicating with said air intake means, laterally spaced pairs of longitudinally extending opposing discharge means extending through said base, said discharge means in each pair opposing each other, a dividing means separating each pair of said discharge means and extending into said housing and vertically spaced from said air intake and pump means, said housing and said dividing means having longitudinally extending depending means, the depending means of said housing including laterally disposed walls having the lower portions thereof extending below said base and directed inwardly and downwardly and the depending means of said dividing means extending below said base and provided with means extending downwardly and outwardly toward each of said lower portions of said housing walls, said base being spaced from said lower portions of said walls and of said depending means of said dividing means, the space between said base and said lower portions and said depending means of the dividing means constituting said opposing pairs of discharge means whereby air is drawn through said intake means into the interior of said housing, is forced through said discharge means, and is directed by said depending means for forming opposing jets of air below said base between said opposing discharge means creating laterally separated air cushions on each side of said dividing means thereby enhancing the stability of the vehicle.

2. A ground-cushion vehicle as recited in claim 1 wherein said base between opposing discharge means has openings therein whereby the interior of the housing communicates with the spaces below the base, flaps pivoted in and covering said openings which, when pivoted out of the plane of the base permit air to escape from below said base causing a thrust in a desired direction for effecting movement of said vehicle.

3. A ground-cushion vehicle comprising a housing having a base, an air chamber, an intake means, said base having laterally spaced longitudinally-extending opposing air discharge means passing therethrough, said discharge means being substantially parallel and arranged in laterally spaced pairs, said housing including laterally disposed walls having the lower portions thereof extending below said base and directed inwardly and downwardly and having an interior forming said air chamber communicating with the atmosphere through said intake means, air-pump means mounted in said intake means whereby air is drawn through said intake means and pumped into said air chamber, longitudinally-extending dividing means disposed below said base between said laterally spaced pairs of discharge means and above said base within said air chamber and spaced below said air intake means by which the air flow in said chamber is directed to said laterally spaced pairs of laterally spaced substantially parallel longitudinally-extending discharge means in said base, the wall of said dividing means below said base being provided with means extending downwardly and outwardly toward each of said lower portions of said housing walls, and said base being spaced from said lower portions of said walls and dividing means, the spaces between said base and said lower portions of said walls and dividing means forming said opposing pairs of air discharge means whereby each pair of discharge means discharging opposing air jets under low pressure from said air chamber creating and maintaining a longitudinally-extending air cushion below said base between said laterally spaced discharge means of each of said pair of said discharge means whereby two parallel and laterally spaced longitudinally-extending air cushions sustain the vehicle with greater stability by an augmented lift force acting on the base and control means for movement of said vehicle, said control means comprising a plurality of pivoted panels constituting portions of said base between each pair of said laterally spaced pair of discharge means for allowing air to escape from below said base causing a thrust in a desired direction for effecting movement of said vehicle.

References Cited in the file of this patent

UNITED STATES PATENTS

| | | |
|---|---|---|
| 2,218,938 | Rinne | Oct. 22, 1940 |
| 2,842,084 | Williams | July 8, 1958 |

FOREIGN PATENTS

| | | |
|---|---|---|
| 219,133 | Austria | Nov. 24, 1958 |

OTHER REFERENCES

Publication: "Popular Science Monthly"; July 1959; pages 51, 52, 53, 54, 55, 194.

Publication: "Flight"; Sept. 1959; pages 195, 196, 197, 198.

Publication: "Symposium on Ground Effect Phenomena"; Oct. 21–23, 1959; presented at Princeton University; pages 240 and 389.